March 22, 1966  W. S. SPEER  3,241,243
HOLE CENTER LOCATING APPARATUS
Filed June 20, 1963  3 Sheets-Sheet 2
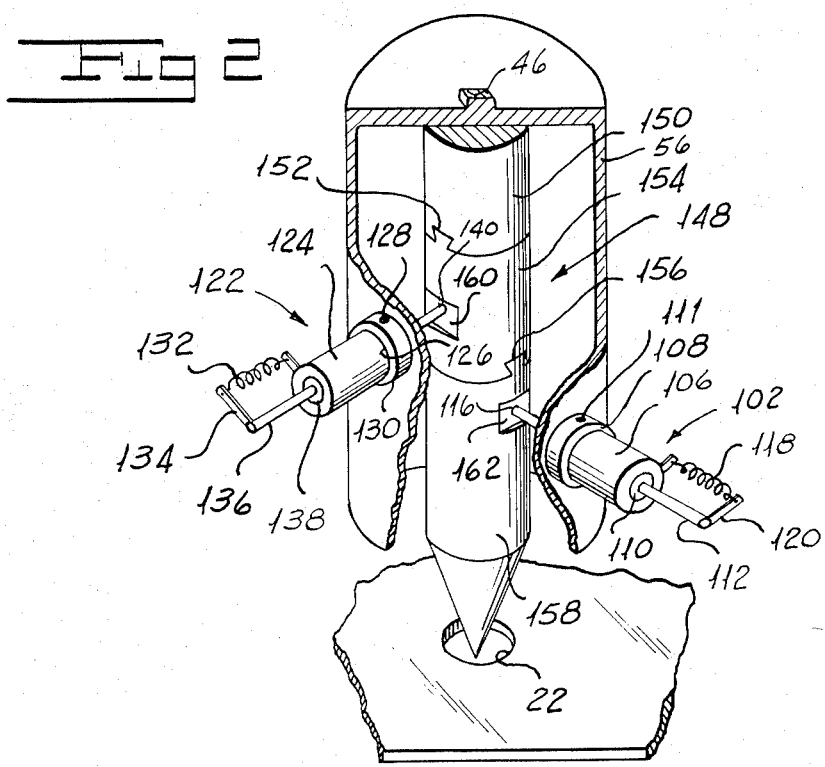
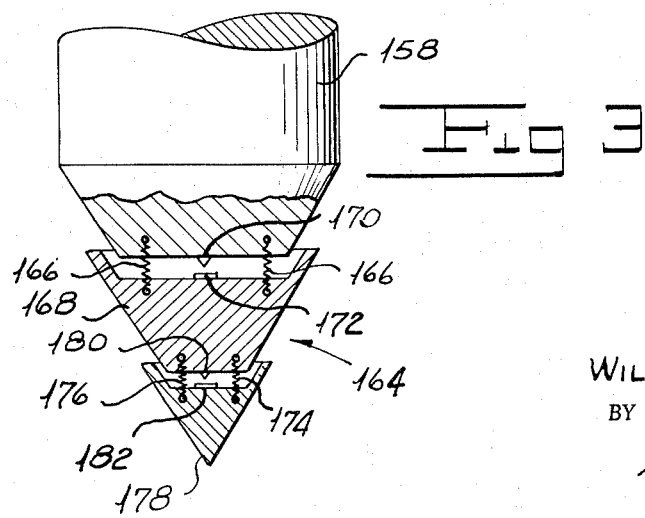
INVENTOR.
WILLIAM S. SPEER
BY
Shenier & O'Connor
ATTORNEYS

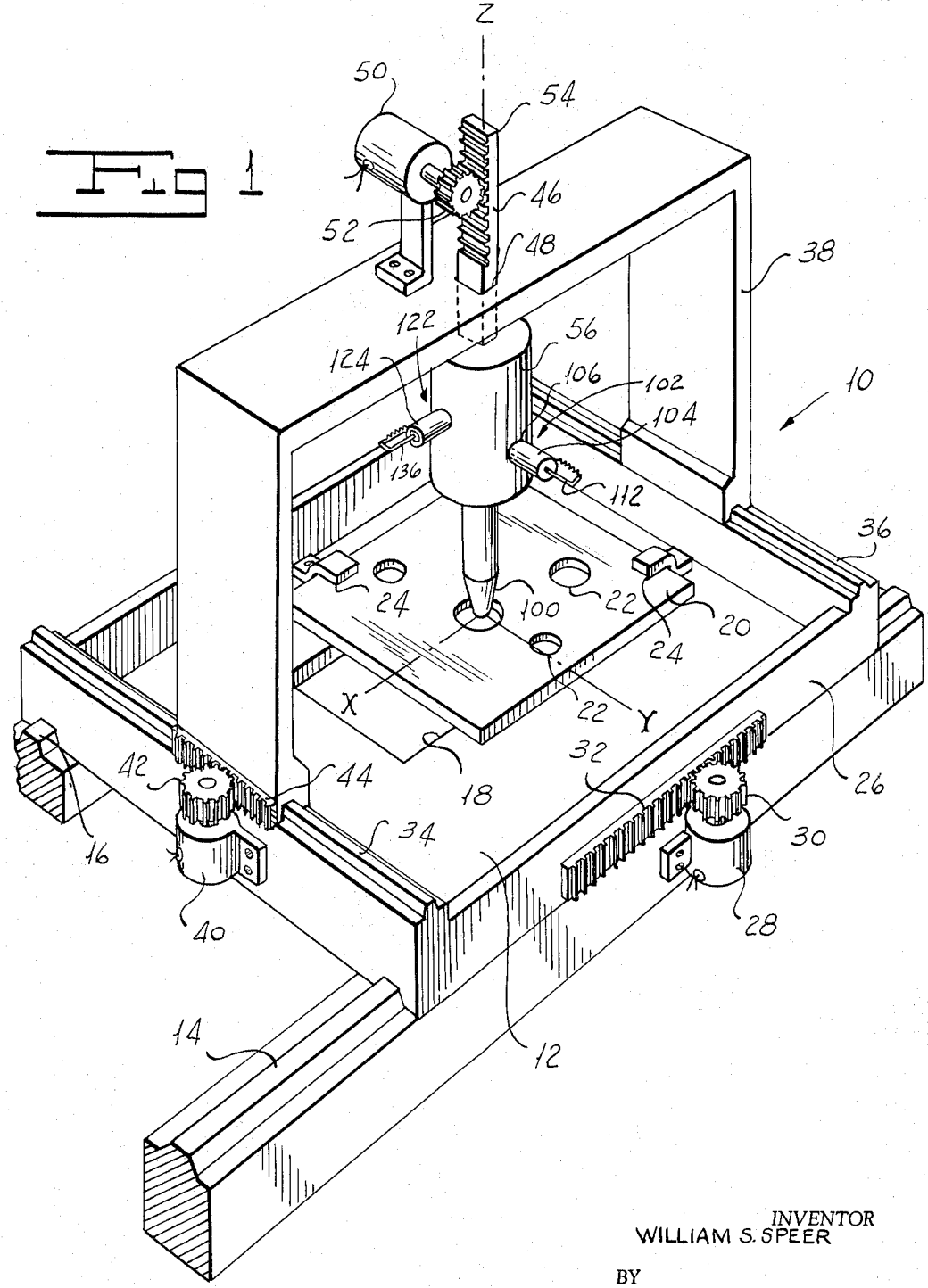

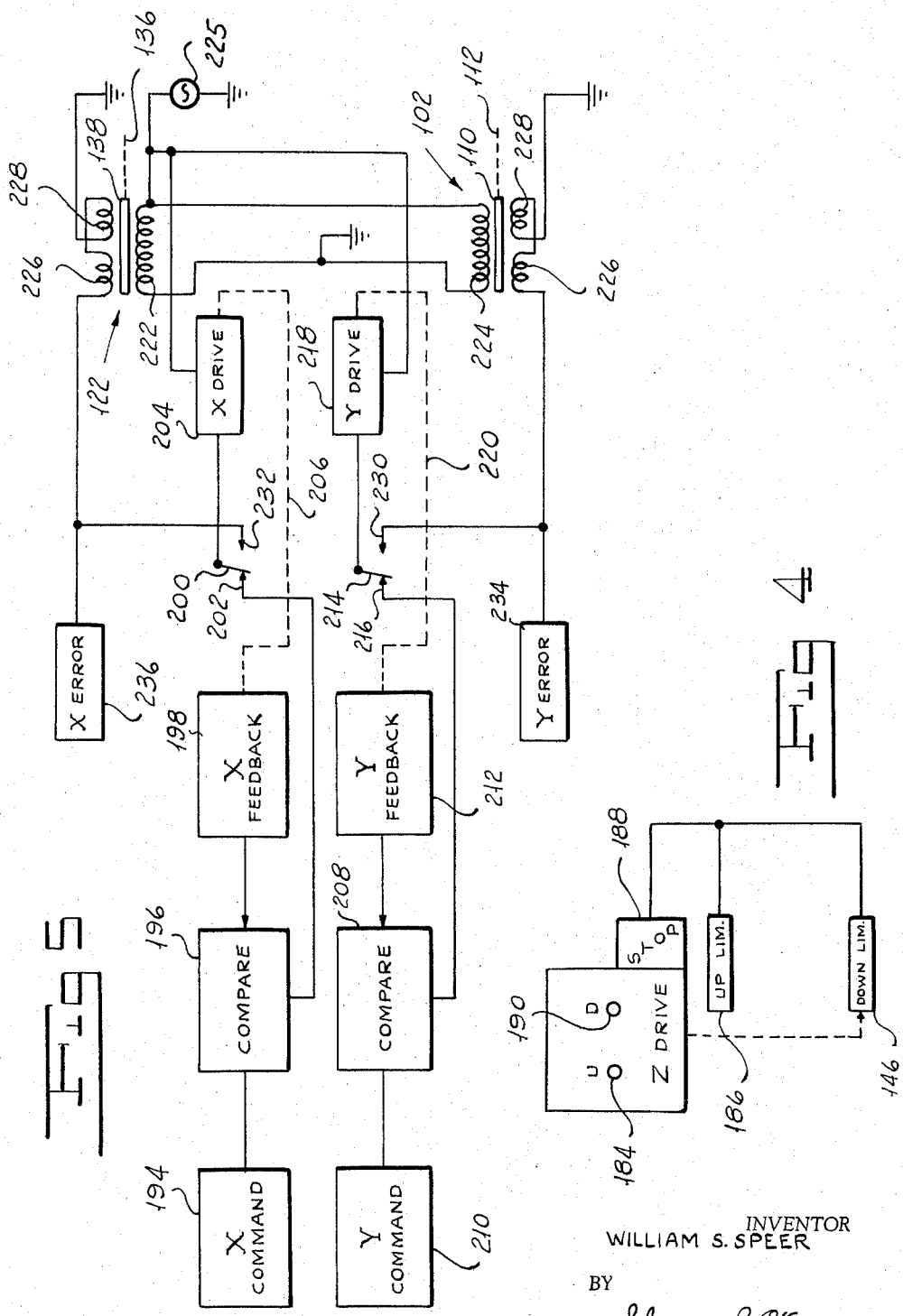

United States Patent Office
3,241,243
Patented Mar. 22, 1966

3,241,243
HOLE CENTER LOCATING APPARATUS
William S. Speer, Santa Ana, Calif., assignor, by mesne assignments, to Coleman Engineering Company, Inc., Los Angeles, Calif., a corporation of California
Filed June 20, 1963, Ser. No. 289,793
9 Claims. (Cl. 33—174)

My invention relates to a hole center locating apparatus and more particularly to a device for precisely locating the center of a hole with reference to a coordinate system.

In many machining operations holes are formed in a workpiece at varoius locations which are predetermined with reference to an orthogonal coordinate system. Inspection of workpieces of this nature requires the determination of the actual location of the hole centers with relation to the coordinate system. Further, some measure of the deviation of the actual centers of the holes from the predetermined locations must be provided if the apparatus for drilling the holes is to be compensated for errors which may have occurred in forming the holes.

In the prior art the operation of measuring the actual center of a hole is an extremely cumbersome and time-consuming operation. One reason for this fact is that measurements must be made with reference to the perimeter of the hole. Not only are these operations in the prior art difficult, but where some means is provided for indicating the error the results are not satisfactory since the error indicating device itself is nonlinear so that it introduces a further error into the system.

I have invented a hole center locating apparatus which locates the center of a hole with reference to a coordinate system with an extremely high degree of accuracy. My apparatus locates the actual center of a hole in a rapid and expeditious manner. My apparatus generates error signals representing the deviation of the actual hole center from a predetermined location with reference to a coordinate system. My hole center locating apparatus operates about a null so that it introduces no error of its own into the measurement.

One object of my invention is to provide a hole center locating apparatus for locating the actual center of a hole with a high degree of accuracy.

Another object of my invention is to provide apparatus for indicating the deviation of the actual center of a hole from a predetermined location with reference to a set of coordinates.

A further object of my invention is to provide hole center locating apparatus which introduces no error of its own in determining the deviation of the actual center of a hole from a predetermined location.

Yet another object of my invention is to provide hole center locating apparatus which does not require measurement to be made with reference to the perimeter of the hole.

Other and further objects of my invention will appear from the following description.

In general my invention contemplates the provision of hole center locating apparatus in which a probe is moved to nominal center coordinates of a hole and then is driven into the hole. I so mount my probe as to permit deviations of the probe with respect to the hole center coordinates as it enters the hole. Sensing devices responsive to movement of the probe with reference to the coordinates produce error signals which are employed to position the probe at the true center coordinate to cause the error signals to be reduced to zero. The error signals afford a measure of the deviation of the actual center of the hole from its nominal center.

In the accompanying drawings which form part of the instant specification and which are to be read in conjunction therewith and in which like reference numerals are used to indicate like parts in the various views:

FIGURE 1 is a perspective view of my hole center locating apparatus illustrating its relationship to a workpiece being inspected.

FIGURE 2 is a perspective view with parts broken away and with other parts shown in section illustrating the details of one form of my hole center locating apparatus.

FIGURE 3 is an elevation with parts in section illustrating a form of probe tip which can be used on my hole center locating apparatus.

FIGURE 4 is a schematic view of the up-down drive system of my hole center locating apparatus.

FIGURE 5 is a schematic view illustrating one form of electrical circuit for controlling my hole center locating apparatus in the X-Y plane.

Referring now to FIGURE 1 of the drawings my hole center locating apparatus indicated generally by the reference character 10 includes a table 12 provided with ways 14 and 16 and having an opening 18 over which a workpiece such as a plate 20 provided with a plurality of holes 22, the centers of which are to be located, may be secured by means of suitable clamps or the like 24. In a manner known to the art, the plate 20 is clamped to the table 12 at a predetermined position with reference to a set of coordinate axes such, for example, as the X and Y axes indicated in the figure so that the nominal centers of the holes 22 are at predetermined locations with reference to the X and Y axes.

The sides 14 and 16 support a generally rectangular carriage 26 for sliding movement in the direction of the X axis. A motor 28 carried by the table 12 is adapted to be energized to drive a gear 30 which engages a rack 32 on the carriage 26 to move the carriage along the X axis.

I provide the carriage 26 with side ways 34 and 36 which support a cross-carriage 38 for movement in the direction of the Y axis. A motor 40 on the carriage 26 is adapted to be energized to drive a gear 42 in engagement with a rack 44 on the cross-carriage 38 to move the carriage in the direction of the Y axis. A vertical support bar 46 is mounted in an opening 48 for movement in the direction of the Z axis indicated in FIGURE 1. A motor 50 on the carriage 38 is adapted to be energized to drive a gear 52 in engagement with a rack 54 on bar 46 to move the bar in the direction of the Z axis.

I secure the housing 56 of my hole center locating apparatus to the bar 46 by any suitable means such as by welding or the like. From the structure thus far described it will be apparent that in response to energization of the motor 28 the housing 56 is moved along the X axis. In response to energization of the motor 40, housing 56 is moved in the direction of the Y axis. When motor 50 is energized, housing 56 is moved in the direction of the Z axis.

Referring now to FIGURE 2, I have shown a form of my device in which a rod indicated generally by the reference character 148 includes a fixed section 150 secured to the top of the housing 56 by any suitable means such as by welding. A dovetail joint 152 connects a first movable section 154 to the fixed section 150 to permit movement of the section 154 in a direction generally perpendicular to the axis of section 150. Another dovetail joint 156 connects a second movable section 158 to the section 154 for movement in a direction generally perpendicular to the axis of section 150 and at right angles to the direction of movement of section 154. I provide the respective sections 154 and 158 with flat gauging surfaces 160 and 162 which are perpendicular to the respective directions of movement of sections 154 and 158. I so mount the rod 148 in housing 56 that section 154 moves in a direction parallel to the X axis while section 158 moves in a direction parallel to the Y axis.

I provide my apparatus with a first sensing device indicated generally by the reference character 102 including a coil assembly 104 which is received by an opening 106 in the wall of the housing 56. A collar 108 around the opening 106 carries a setscrew 111 which adjustably secures the coil assembly 104 in position in the opening 106. With the housing 56 mounted on the cross-carriage 38 in the manner described above the axis of coil assembly 104 normally is parallel to the Y axis. The transducer 102 includes a core 110 carried by a rod 112. One end of the rod 112 is provided with a rounded tip 116. A spring 118 extending between an arm 120 on the other end of rod 112 and the coil assembly 104 normally urges the tip 116 into engagement with the gauging surface 162 on rod section 158. As will be explained hereinafter, with the core 110 centered with reference to the coil assembly 104, transducer 102 produces no output signal. I adjust the position of the coil assembly 104 so that with rod section 158 axially aligned with section 150, the core 110 is centered with reference to the coil assembly 104.

My apparatus includes a second transducer indicated generally by the reference character 122 including a coil assembly 124 adjustably mounted in an opening 126 by a setscrew 128 carried by a collar 130 surrounding the opening 126. A spring 132 extending between an arm 134 on one end of the rod 136 carrying the core 138 of transducer 122 and the coil assembly 124 normally urges a rounded tip 140 on the other end of the rod 136 into engagement with a flat gauging surface 160 on rod section 154. I so mount the housing 56 on the carriage 38 that the axis of rod 136 normally is parallel to the X axis. The assembly 124 is so positioned that with rod section 154 aligned with section 150, core 138 is centered in the assembly 124 and transducer 122 produces no output signal.

Referring now to FIGURE 3, I have shown a form of tip or plug indicated generally by the reference character 164 which can be used in my hole center locating apparatus. In this form of the device springs 166 connect an intermediate tip member 168 to the section 158 so that respective electrical contacts 170 and 172 are normally out of engagement. Springs 174 and 176 connect a tip end member 178 to the intermediate element 168 so that contacts 180 and 182 carried by respective elements 168 and 178 normally are out of engagement. With this arrangement as the assembly moves toward the work having a hole therein if the tip 178 engages the work to indicate that the assembly is not even properly positioned at a nominal location, then contacts 180 and 182 first contact each other. I make springs 174 and 176 to have a greater compliance than do springs 166 to cause contacts 180 and 182 to engage before contacts 170 and 172 can engage. If now the assembly continues to move toward the work, ultimately contacts 170 and 172 close so that both sets of contacts are closed and an indication is thus afforded that no hole has been sensed.

If on the other hand the apparatus has been positioned adjacent the nominal hole location, as the assembly moves toward the work the tip 178 will enter into the hole without engaging the work and contacts 180 and 182 will not close. Upon continued movement of the probe element 168 engages the work to close contacts 170 and 172. Closing of contacts 170 and 172 with contacts 180 and 182 open indicates that a hole has been correctly sensed. In this arrangement it will readily be appreciated that the diameters of the respective members 168 and 178 must be properly related to the diameter of the hole being sensed.

Referring now to FIGURE 4, I have shown a schematic view of the Z axis drive system. Since the details of drives of this type are known in the art the apparatus will not be described in detail. In response to the operation of an "up" drive pushbutton 184 motor 50 is energized to move the housing 56 up until an "up limit" switch 186 is actuated to produce a signal which is fed to the "stop" section 188 of the drive to stop motor 50. In response to the operation of a pushbutton 190 motor 50 is energized to drive housing 56 down until either both sets of contacts 180–182 and 170–172 close to indicate that no hole has been sensed or only contacts 170–172 close to indicate that the probe is centered in a hole. In either event the motor drive is stopped. As indicated by the box 146 in FIGURE 4 at the "down limit" position a signal is sent to the section 188 to stop the motor 50.

Referring now to FIGURE 5, I have shown a schematic view of the X–Y plane drive control system. An X command unit 194 produces an output signal representing the nominal position along the X axis of the center of a hole to be inspected. It will readily be appreciated that unit 194 can be manually actuated or it may read the command signal from a tape or the like. I feed the signal from the unit 194 to a comparator 196 together with a signal from a feedback signal generator 198 which produces a signal representing the actual position of carriage 26 in the direction of the X axis. Under these conditions the comparator 196 produces an output error signal which represents the difference between the actual position of the carriage 26 and the nominal location of the hole being inspected with reference to the X axis. I feed this signal through a switch 20 in engagement with a contact 202 to the X drive 204 to energize motor 28 to drive carriage 26 until the carriage has positioned the housing 56 along the X axis at the nominal X coordinate of the center of the hole being inspected. The connection between the X drive 204 and the feedback signal generator 198 is indicated schematically by the broken line 206 in FIGURE 5.

The Y axis control system includes a comparator 208 which receives one input signal from a command signal generator 210 similar to the generator 194 and a second signal from Y feedback signal generator 212. In response to these inputs the comparator feeds an error signal through a switch arm 214 in engagement with a contact 216 to the Y drive control 218 which energizes motor 40 to drive the cross-carriage 38 toward the nominal location of the hole center in the direction of the Y axis. The connection between the Y drive system 218 and the feedback signal generator 212 is indicated schematically by the broken line 220. Since drive systems per se of the type I have shown for the X and Y axes drives are known in the art, they have not been illustrated in detail.

The transducers 102 and 122 include respective input windings 222 and 224 which I energize from a suitable source of energy 225. Each transducer 102 and 122 includes secondary windings 226 and 228 connected in series opposition. With this arrangement the transducers produce no output signals as long as their respective cores 110 and 138 are centered with respect to the input and output windings.

I connect the output windings of the respective transducers 102 and 122 to contacts 230 and 232 associated with switch arms 214 and 200. The arrangement is such that when the housing 56 has been positioned at the nominal X and Y coordinates of the center of the hole under inspection switch arms 200 and 214 are moved into engagement with contacts 232 and 230 and the Z drive is energized to move housing 56 down toward the hole. Now as the plug or gauge 148 enters the hole if a difference exists between the actual center of the hole and the nominal center then the respective transducers 102 and 122 produce output signals which indicate the deviations along the X and Y axes of the actual hole center from the nominal hole center. These signals are coupled to the X and Y drives to energize motors 28 and 40 to move the housing 56 until the housing is positioned at a location at which the axis of rod 148 passes through the actual center of the hole. At this point the cores 110 and 138 will be centered with reference to their corresponding coil assemblies so that the output signals of transducers 102 and 122 are zero or at a null. I feed the output signals from the respective transducers 102 and 122 to error indicating devices 234 and 236 to record the error of the actual position of the center of the hole being gauged with respect to the nominal center thereof. It will be apparent from the above description and from the showing of transducers 102 and 122 in the drawings that with the core 110 positioned centrally or at its null position no output signal is produced. In response to displacement of the core 110 in one direction, a signal will be produced having one phase and having a magnitude proportional to the displacement. In response to displacement in the other direction, a signal is produced having an opposite phase and a magnitude proportional to the displacement.

In operation of my hole center locating probe I first position the housing 56 so that the axis of the rod 148 passes through the nominal coordinates in the X–Y plane of the hole being probed. I accomplish this by setting the respective X and Y coordinates into the command units 194 and 210. Comparators 196 and 208 compare the actual location of the housing with the commanded position to produce respective signals for energizing motors 28 and 40. Motor 28 drives the carriage 26 along the X axis. The connection 206 applies the position of the carriage in the X direction to the feedback generator which supplies the comparator 196 with an actual position signal until the actual position along the X axis corresponds with the nominal X coordinate of the hole. Concomitantly motor 40 drives the cross-carriage 38 in the direction of the Y axis and the coupling 220 actuates the feedback generator 212 to apply a signal to the comparator 208 until the actual position of the rod 148 along the Y axis corresponds to the nominal Y coordinate of the hole being probed.

When the rod 148 has thus been positioned at the nominal location in the X–Y plane of the hole, button 190 is actuated to energize motor 50 in a direction to drive the rod down toward the hole. As rod 148 moves downwardly, the tapered end of section 158 moves into the hole 22. When either no hole is sensed or when the plug 168 is firmly seated in the hole, switch 146 is operated to stop the motor. As the section 158 moves into the hole if the actual coordinates of the hole center do not correspond exactly to the nominal position of the hole center, the movable sections 154 and 158 of the rod shift laterally. In response to the displacement of section 158 along the Y axis, core 110 of the transducer 102 moves from its null position so that its secondary windings 226 and 228 produce an output signal indicating an error in the nominal Y coordinate. This error is indicated by indicator 236.

Displacement of section 154 along the X axis causes core 138 of transducer 122 to move from its neutral position to produce an X error signal which is indicated on the indicator 234.

After the rod 148 has been moved to the nominal hole center position, switch arms 200 and 214 can be moved to engage contacts 232 and 230 to cause the error signals to be fed into the X and Y drive systems to position the probe precisely at the actual hole center so that the axes of all sections of rod 148 are aligned and now pass through the actual hole center.

If desired I may provide the probe with a tip such as is shown in FIGURE 8. With this arrangement, as the rod 158 moves downwardly where no hole is present both pairs of contacts 170 and 172 and 180 and 182 close indicating that no hole is present. If, however, as the rod moves downwardly contacts 180 and 182 do not engage while contacts 170 and 172 do engage, then an indication is given that a hole has been located.

It will be seen that I have accomplished the objects of my invention. I have provided a hole center locating apparatus which locates the actual center of a hole with a high degree of accuracy. My apparatus does not require measurements to be made with reference to the hole perimeter. It indicates the deviation of the actual center of a hole from a nominal center thereof in a coordinate system. My apparatus operates about a null so that it does not introduce any error of its own into the measurement.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for locating the actual center of a hole having a nominal center defined by a pair of coordinates including in combination a probe adapted to be inserted into said hole, means for moving said probe to said nominal center, means for moving said probe into said hole, first means responsive to movement of said probe into said hole for producing a signal indicating the movement of said probe with reference to one of said coordinates, second means responsive to movement of said probe into said hole for producing a second signal indicating the movement of said probe with reference to the other of said coordinates and means responsive to said signals for moving said probe to said actual center.

2. Apparatus for locating the actual center of a hole having a nominal center defined by a pair of coordinates including in combination a probe adapted to be inserted into said hole, means for moving said probe to said nominal center, means for moving said probe into said hole, first means operating around a null for producing a signal indicating the movement of said probe with reference to one of said coordinates in response to movement of said probe into said hole, second means operating around a null for producing a second signal indicating the movement of said probe with reference to the other of said coordinates in response to movement of said probe into said hole and means responsive to said signals for moving said probe to said actual center to return said signal producing means to the null.

3. In apparatus for locating the actual center of a hole having a nominal center in a workpiece, a probe adapted to be inserted into said hole, means for moving said probe to said nominal center, means for moving said probe toward said workpiece, a first switch, a second switch, means responsive to actuation of said first switch as said probe moves toward said workpiece for indicating that said probe has entered said hole, and means responsive to actuation of said first switch and actuation of said second switch as said probe moves toward said workpiece for indicating that said probe has engaged said workpiece without entering said hole.

4. Apparatus for locating the actual center of a hole having a nominal center lying in a plane including in combination a probe adapted to be inserted into said hole, a support, means mounting said probe on said support for movement parallel to said plane, means mounting said support for movement with reference to said plane, means for moving said support from a position corresponding to a position in said plane remote from said nominal center to a position corresponding to said nominal center, means for moving said probe into said hole and means responsive to movement of said probe parallel to said plane relative to said support in response to movement of said probe 5. Apparatus for locating the actual center of a hole in a member, said hole having a nominal center lying in a plane including in combination a probe adapted to be inserted into said hole, a support, means mounting said probe for movement parallel to said plane on said support, means mounting said support for movement with reference to said plane, means for moving said support from a position corresponding to a position in said plane remote from said nominal center to a position corresponding to said nominal center, means for moving said probe into said hole, and means responsive to movement of said probe parallel to said plane relative to said support as said probe engages said member as said probe moves into said hole for producing an indication of the deviation of said actual center from said nominal center.

6. Apparatus for locating the actual center of a hole in a member, said hole having a nominal center in a plane defined by a two-coordinate system including in combination a probe adapted to be inserted in said hole, a support, means mounting said probe on said support for movement in the direction of said coordinates, means mounting said support for movement with reference to said plane, means for moving said support from a position corresponding to a position in said plane remote from said nominal center to a position corresponding to said nominal center, means for moving said probe into said hole and means responsive to movement of said probe along said coordinates in response to engagement of said probe with said member as said probe moves into said hole for indicating the deviation of said actual center from said nominal center.

7. Apparatus for locating the actual center of a hole having a nominal center lying in a plane including in combination a probe adapted to be inserted into said hole, a support, means mounting said probe on said support, means mounting said support for movement with reference to said plane, means for moving said support from a position corresponding to a position in said plane remote from said nominal center to a position corresponding to said nominal center, means for moving said probe into said hole, means responsive to movement of said probe into said hole for producing a signal proportional to the deviation of said actual center from said nominal center and means responsive to said signal for actuating said support moving means to position said support at a position corresponding to said actual center.

8. Apparatus for locating the actual center of a hole having a nominal center lying in a plane defined by a two-coordinate system including in combination a probe adapted to be inserted into said hole, a support, means mounting said probe on said support, means mounting said support for movement in the direction of said coordinates, first drive means for moving said support in the direction of one of said coordinates, second drive means for moving said support in the direction of the other of said coordinates, means for actuating said first drive means for moving said support to a position corresponding to one of said nominal center coordinates, means for actuating said second drive means to position said support at the other nominal center coordinate, means for moving said probe into said hole and means responsive to movement of said probe into said hole for producing responsive signals indicating the deviation of the actual center of said hole from said nominal center along the respective coordinates.

9. Apparatus for locating the actual center of a hole in a member, said hole having a nominal center lying in a plane defined by a two-coordinate system including in combination means mounting said probe for movement in the direction of said coordinates, first means for moving said probe to said nominal center, second means for moving said probe into said hole, first means responsive to movement of said probe relative to said first moving means in a direction parallel to one of said coordinates in response to engagement of said probe with said member as said probe moves into said hole for producing a signal proportional to the deviation of said actual center from said nominal center in the direction of one of said coordinates and second means responsive to movement of said probe relative to said first moving means in a direction parallel to the other coordinate in response to engagement of said probe with said member as said probe moves into said hole for producing a second signal proportional to the deviation of said actual center from said nominal center in the direction of the other coordinate.

References Cited by the Examiner

UNITED STATES PATENTS

| | | | |
|---|---|---|---|
| 1,615,668 | 1/1927 | Anderson | 33—189 |
| 2,353,726 | 7/1944 | Guttmann | 33—125 |
| 2,697,880 | 12/1954 | Tandler | 33—174 |
| 2,814,124 | 11/1957 | Blake | 33—172 |
| 2,911,727 | 11/1959 | Steinhart | 33—174 |
| 2,930,976 | 3/1960 | Hirdler | 33—174 X |
| 2,995,826 | 8/1961 | Brault | 33—189 |
| 3,108,381 | 10/1963 | Kuebler | 33—189 X |
| 3,137,942 | 6/1964 | Powers et al. | 33—189 X |

ISAAC LISANN, *Primary Examiner.*